June 4, 1946.  J. F. JEANNIN  2,401,567
POWER TRANSMISSION
Original Filed July 10, 1942   3 Sheets-Sheet 1
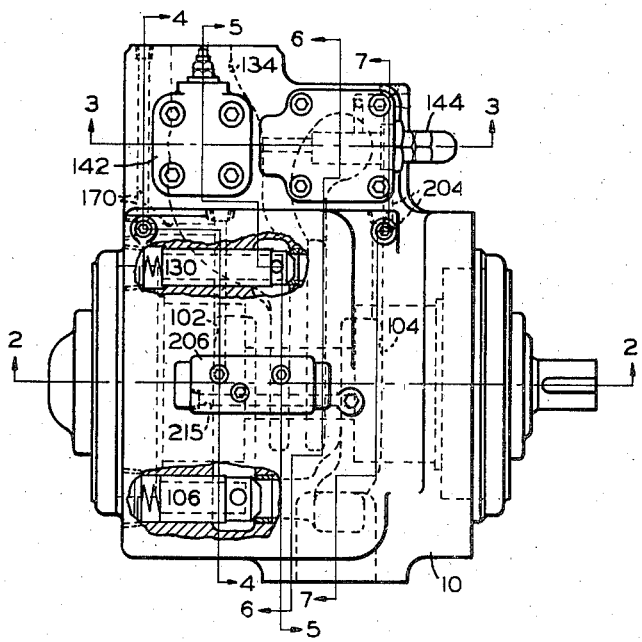
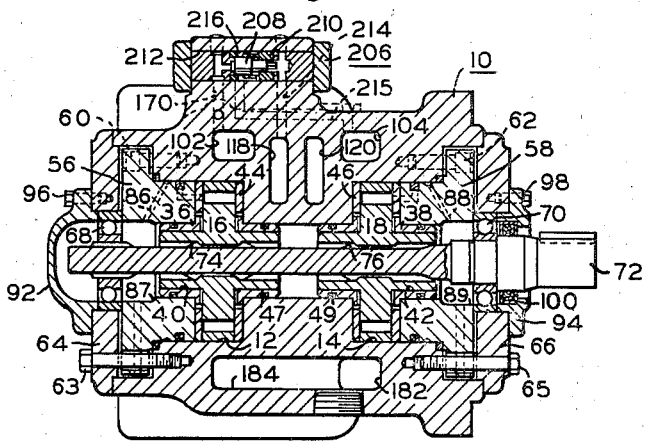
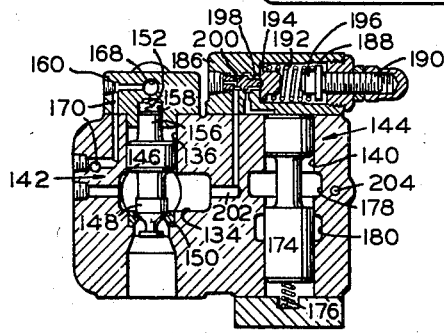
INVENTOR.
JOHN F. JEANNIN
BY
ATTORNEY.

June 4, 1946.  J. F. JEANNIN  2,401,567
POWER TRANSMISSION
Original Filed July 10, 1942   3 Sheets-Sheet 2
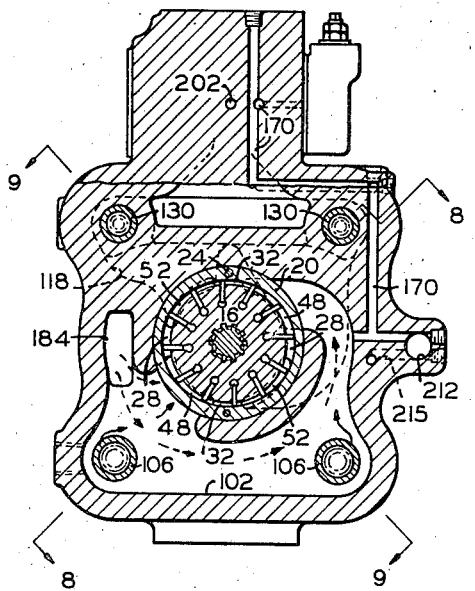
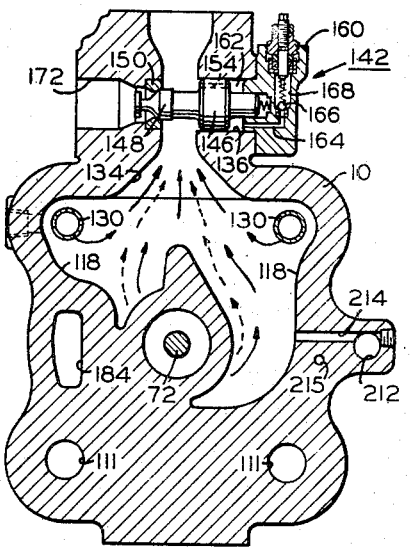
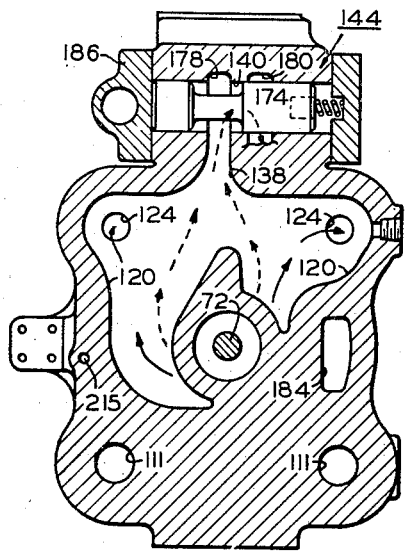
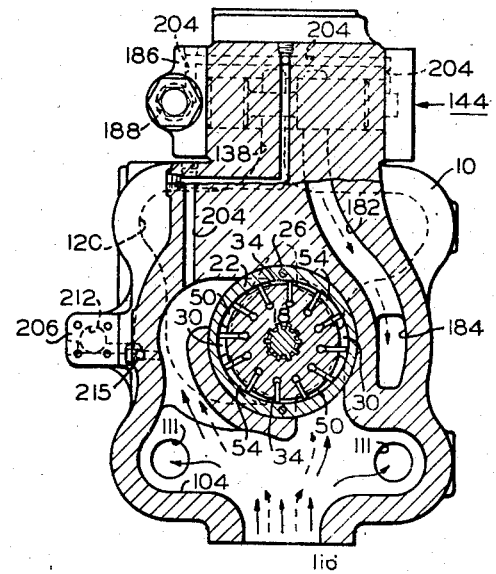
INVENTOR.
JOHN F. JEANNIN
BY Ralph L. Tweedale
ATTORNEY.

INVENTOR.
JOHN F. JEANNIN
ATTORNEY.

Patented June 4, 1946

2,401,567

UNITED STATES PATENT OFFICE 2,401,567

POWER TRANSMISSION

John F. Jeannin, Detroit, Mich., assignor to Vickers Incorporated, Detroit, Mich., a corporation of Michigan Original application July 10, 1942, Serial No. 450,368. Divided and this application May 20, 1944, Serial No. 536,489

2 Claims. (Cl. 103—135)

This invention relates to power transmissions, particularly to those of the type comprising two or more fluid pressure energy translating devices, one of which may function as a pump and another as a fluid motor.

The present application is a division of applicant's co-pending application Serial No. 450,368, filed July 10, 1942, patented June 5, 1945, No. 2,377,556.

The invention is more particularly concerned with a compound pump unit. There is disclosed in the patent to Harry F. Vickers, No. 2,218,565, a compound, positive-displacement pump circuit wherein two or more pumps may be operated in parallel with the delivery pressure which they are pumping against low or moderate and, when such pressure rises to a higher value, they may be automatically reconnected to pump in series.

The present invention is concerned with a compound pumping system of this character, and it is more particularly an object to provide a single compact unitary device incorporating two pumps and all of the necessary control valves and passages whereby they may be operated either in parallel or in series depending upon delivery pressure.

It is a further object to provide a structure of this character having certain constructional advantages contributing to reliability and long life as well as to ease of maintenance.

Further objects and advantages of the present invention will be apparent from the following description, reference being had to the accompanying drawings wherein a preferred form of the present invention is clearly shown.

In the drawings:

Figure 1 is a top view of a pumping unit showing particularly the relative arrangement of passageways and valves.

Figure 2 is a cross section on line 2—2 of Figure 1 showing a preferred form of the present invention.

Figure 3 is a cross section on line 3—3 of Figure 1.

Figure 4 is a cross section on line 4—4 of Figure 1.

Figure 5 is a cross section on line 5—5 of Figure 1.

Figure 6 is a cross section on line 6—6 of Figure 1.

Figure 7 is a cross section on line 7—7 of Figure 1.

Figure 8:
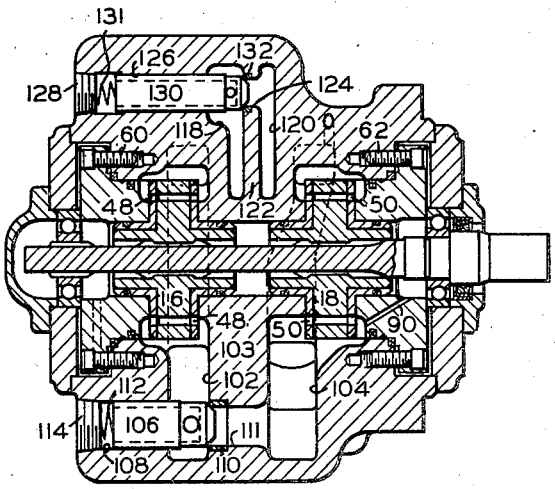
Figure 8 is a cross section on line 8—8 of Figure 4.

Referring now to Figures 1 and 2 of the drawings, there is illustrated a unitary structure generally designated 10 having two cylindrical recesses 12 and 14 in axial alignment and within which are mounted rotary pumping cartridges or units 16 and 18. The latter may be of any suitable type and as shown are similar to the vane pump described in the patent to Harry F. Vickers, No. 1,989,900. It will be understood that, although many of the details of the construction of such patented pump are omitted from the following description, they may of course be considered as present in such units by reference.

Rotary units 16 and 18, as shown in Figures 4 and 7, are identical in construction and comprise annular liner rings 20 and 22 which are secured to the main body structure 10 by screws 24 and 26, respectively. The inner surfaces of ring members 20 and 22 are substantially elliptical in shape to generally form the balanced working chambers 28 and 30, respectively. The greater part of the surfaces of the rings 20 and 22, which define the working chambers 28 and 30, are substantially concentric as are also the diametrically positioned portions 32 and 34 thereof which receive and support the main body of the rotors. By design pump 18, a first-stage unit, has a slightly larger volumetric output or capacity than pump 16, a second-stage unit. This is accomplished by forming the elliptical contour of the ring member 20 of pump 16 with a slightly larger minor diameter than that of ring member 22, their respective major diameters being equal.

The rotors of units 16 and 18, as shown in Figure 2, are also supported by oppositely-positioned, one-piece bushing units 36 and 38, respectively. The bushing units consist of bearing members 40 and 42, which support the bearings of the rotors, and laterally extending flanges 44 and 46, respectively. Each bushing unit is provided with a sealing ring at 47 and 49. Flanges 44 and 46 of the bushing units are provided with concentric, circumferentially spaced, arcuate and relatively long and narrow inlet ports 48 and 50 and outlet ports 52 and 54, respectively (see Figures 4 and 7).

Pump units 16 and 18 are retained in their respective recesses by head plates 56 and 58 (Figure 2). The latter are independently mounted and adapted to snugly fit within the recesses 12 and 14 to insure equal distribution of clamping pressure over their respective units. Head plates 56 and 58 are adjustably secured by means of bolts 60 and 62, respectively, to the main body structure 10. Also mounted thereto, by means of bolts 63 and 65, are bearing plates 64 and 66 which carry ball bearings 68 and 70, respectively, in which the ends of a shaft 72 are rotatably mounted. It will be noted that the bearing plates 64 and 66 are mounted independently of the head plates 56 and 58 and of the shaft 72, and can be securely affixed without disturbance of the setting of the head plates. Likewise, the adjustment of head plates 56 and 58 can in no way affect the alignment of the shaft bearings. Shaft 72 is splined at 74 and 76 to slidably receive a broached complementary splined portion formed in the rotors of units 16 and 18 to provide a driving connection therefor.

Figure 9:
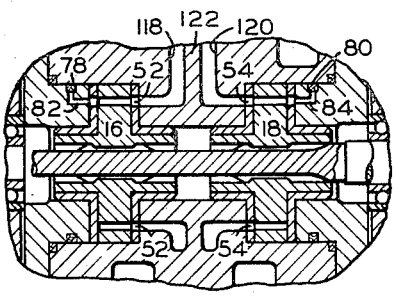
Figure 9 is a fragmentary cross section taken on line 9—9 of Figure 4 showing the relative arrangement of the pressure ports of the pumping units and pressure sealing means for the head plates thereof.

Head plates 56 and 58 are provided with sealing rings 78 and 80 on their periphery which communicate with the pressure side of their respective pumps through passages 82 and 84, as best shown in Figure 9. The head plates 56 and 58 also include drilled passages 86 and 88 through which leakage fluid is drained to internal chambers 87 and 89 thereof. The latter chamber communicates with the suction side of the pump 18 through an obliquely extending passage 90. This provides for internal drainage of the unit 10 by having the fluid drained into chamber 87 of the head plate 56 pass through the splines of the shaft 72 and into chamber 89 of the head plate 58, where it is withdrawn by pump 18 through a passage 90 (see Figure 8). End caps 92 and 94 are mounted on the bearing plates 64 and 66 by screws 96 and 98, respectively (Figure 2). End cap 94, because of internal drainage, carries a sealing ring 100 arranged to prevent the escape of oil from within and the admission of air from without.

The main body structure 10, as shown in Figures 4 and 7, is provided with cored inlet passages 102 and 104 which have arcuate branch portions extending partially around the shaft 72, disposed radially outward thereof to connect with the suction ports 48 and 50 of the pump units 16 and 18, respectively. The branch portions of the inlet cores 102 and 104, as shown in Figure 8, envelope their respective rotors, providing for the intake of liquid from both sides thereof to eliminate cavitation in filling the work chambers of the pump rotors.

The cores 102 and 104 both extend generally downward beyond the pump units and are there separated by a common single wall 103, as seen in Figure 8. A pair of check valves 106 are mounted in bores 108 which are in alignment with bores 111. These valves may be constructed as illustrated and described at 98 in the Herman Patent No. 2,280,392. The latter connect the two cores 102 and 104 and carry an annular seat 110 against which the check valve is normally urged into contact by a spring 112, the latter abutting against a plug 114. Core 104 (Figure 7) is provided with a branch portion 116 which extends therefrom to the bottom portion of the unit 10 to form a suction inlet for the two pump units 16 and 18. The former unit draws fluid through the bores 111 (Figure 8) which are open to free flow from passage 104 but are closed automatically by check valves 106 to flow in the opposite direction, as during series operation hereinafter disclosed.

The body 10 is also provided with cored pressure passages 118 and 120 (Figures 5 and 6) which have arcuate branch portions extending around the shaft 72, disposed radially thereof to connect with the pressure ports 52 and 54 of the pump units 16 and 18, respectively (Figure 9). As shown in Figure 8, the pressure cores 118 and 120 extend upwardly beyond the pump units and are separated by a common wall 122 through which extend passages 124, of which only one is shown in Figure 8. In alignment with the passage 124 is a bore 126 extending to the exterior of the body unit and normally closed by a threaded pipe plug 128. Slidably mounted in the bore 126 is a check valve 130 which is biased by a spring 131 against an annular seat 132 carried by the bore 124. The latter is thus open to free flow from the passage 120 but is closed automatically to flow in the opposite direction, as during series operation later to be described.

Pressure core 118 (Figure 5) connects with a passage 134 which extends to the upper side of the unit 10 forming a delivery conduit therefor, and is intersected by a transverse bore 136, while pressure core 120 (Figure 6) connects with a passage 138 which leads to a transverse bore 140.

It will be noted from Figure 4 that the unit 10 is provided with two suction check valves 106 and two pressure check valves 130 for the purpose of rendering it compact and symmetrical about its axis. The use of two check valves also enables their action to be more rapid and reliable.

Mounted in transverse bores 136 and 140 (Figures 5 and 6) are relief and sequence valves 142 and 144, respectively. As shown in Figures 3 and 5, relief valve 142 comprises a piston 146 slidably mounted in bore 136 and having an extended valve portion 148 normally closing the seat 150 under pressure of a light spring 152. Piston 146 is provided with an orifice 154 therethrough and a tubular pilot 156 slidable in bore 158 in an end cap 160. The latter is secured to the outer face of the body 10 to close the bore 136 and to provide a control chamber 162 for the relief valve piston 146. A passage 164 extends between the chamber 162 and a spring-loaded ball relief valve 166 mounted in chamber 168.

Chamber 168 of end cap 160 (Figures 3 and 4) communicates through drilled passageways 170 with the inlet core 102 of the pump unit 16, which passageways serve as a drain therefor and also for another purpose hereinafter disclosed.

Briefly, the valve 146 acts to maintain a predetermined pressure in passage 134 (Figure 5) by opening and discharging excess fluid into passage 172. Whenever a predetermined pressure is reached, it causes the spring-loaded ball relief valve 166 to open and relieve control chamber 162 of liquid at a rate faster than can be supplied through the orifice 154. This causes the piston 146 to become unbalanced and move to the right away from its seat 150 until sufficient pressure is restored to the control chamber 162. Since pilot relief valve 166 is backed up so to speak by the pressure, if any, in inlet core 102, the predetermined pressure above referred to is measured over and above that existing in core 102.

Sequence valve 144 (Figures 3 and 6) comprises a valve spool 174 slidably mounted in the bore 140 and normally biased upward (Figure 3) by a spring 176 to cut off port 178 from port 180. Port 178 connects with the passage 138 (Figure 6) while port 180 connects with a passage 182 (see Figure 7) which extends to a core 184. The latter extends longitudinally across the side of the body 10 and communicates with the inlet core 102 of pump 16 (see Figure 4).

The upper end of the bore 140 (Figure 3) of sequence valve 144 is closed by an end cap member 186 containing a bore 188 in which is mounted an adjusting screw 190 for varying the pressure setting of a spring 192. The latter is positioned intermediate two spring guides 194 and 196, the former abutting against a piston 198 mounted in bore 200. The latter is responsive to pressure in the delivery conduit 134 through passages 202 and is arranged to connect the pressure therein with the top of valve spool 174 whenever the setting of the spring 192 has been reached.

End cap member 186 includes passages 204 (see Figure 7) which connect the bore 188 and the bottom of valve spool 174 with the inlet core 104 to provide a drain therefor.

The unit 10 also incorporates a pressure dividing valve 206 (Figure 2) which causes the pumps 16 and 18 each to carry its proportionate share of the main pressure during series flow, hereinafter described. Valve 206 comprises a differential piston 208 mounted in a sleeve 210 which is fixed in a bore 212. Piston 208 has an area differential of one to two, of which the larger-area end communicates with the inlet core 102 of pump 16 through passage 170, and the smaller-area end communicates through passage 214 with the pressure core 118 of pump 16. It will be remembered that core 118 connects with the passage 134 (Figure 5) which forms the delivery conduit for the pumping unit 10, thus constantly exposing the small end of pressure dividing valve 208 to the work pressure of the circuit. Valve 206 is provided with a return conduit 215, shown by dotted lines in Figure 2 for sake of clarity although properly lying above the plane of the paper, which connects port 216 of sleeve 210 (Figure 2) to the inlet core 104 (Figure 7) of pump unit 18.

In operation, with shaft 72 rotating, oil is drawn by the pump units 16 and 18 through the suction passage 116, unit 16 drawing oil through check valves 106. This oil is drawn in through suction ports 48 of unit 16 (Figure 4) and delivered through delivery ports 52 and into the pressure core 118 (Figure 5). Pump 18 (Figure 7) draws in oil through suction ports 50 and delivers the same through delivery ports 54 thereof and into the pressure core 120 (Figure 6) where it flows through pressure check valves 130 (Figure 8) into the core 118.

With the parts of the control valves in the positions shown, the combined flow of the pump units 16 and 18 passes through the delivery conduit 134 to the work circuit so long as the pressure therein remains below the setting of the sequence valve 144. Such flow is indicated throughout the figures by solid arrows. It will be understood that the relief valve 142 is normally set for the maximum pressure of either pump unit, e. g., 1,000 p. s. i., while the sequence valve 144 is given a pressure setting slightly below that of relief valve 142, e. g., 950 p. s. i. It will be noted that the sequence valve 144 is operated by the pressure in the delivery conduit 134 (Figure 3) through passage 202. Thus, so long as the pressure therein is below the setting of the valve 144, the latter will remain closed, and the entire discharge of the pumps 16 and 18, their combined flow, is delivered through passage 134.

Under these conditions, if the pump unit 10 is adapted to drive a fluid motor, such as a machine tool cylinder, the piston therein will move at a rapid traverse rate. As resistance to this movement is encountered either by meeting the work or by operation of a suitable flow rate reducing valve, the pressure in the delivery conduit 134 will build up and, being transmitted to the small piston 198 (Figure 3) of the sequence valve 144, will overcome the force of the spring 192 thereof, thus opening valve 144 to connect ports 178 and 180 thereof. This will bypass the delivery of pump 18 through passages 178, 180, 182 and 184 (Figures 6 and 7) to the inlet core 102 of the pump unit 16 (Figure 4). This flow and that hereafter described are shown by dotted lines.

Pump 16 was previously pulling oil through the check valves 106, and the pressure dividing valve 206 was held closed by pressure in core 118. However, after the opening of the sequence valve 144, pump 16 will receive its supply from the passages 182 and 184, and, as this fluid is under pressure, it will cause check valves 106 to close. Pump 18 having a slightly larger capacity than pump 16, the surplus oil is returned through the pressure dividing valve 206 to the inlet core 104 of the pump unit 18. As hereinbefore disclosed, the pressure dividing valve 206 is so constructed that the working pressure area exposed to the pressure core 118 has a definite relationship to the working pressure area exposed to the inlet core 102 of the pump 16. This relationship being one to two in the present example, the pressure in core 102 of the pump 16 will be one-half the pressure in the delivery core 118. This relationship is maintained by valve 206 lying in a slightly open position such that the excess volume delivered by pump 18 above that taken in by pump 16 is by-passed from passage 214 to passage 215 (Figure 2).

The action of the present pump circuit and its control valve is more fully described in the patent to Harry F. Vickers, 2,218,565, to which reference is made for more detailed consideration of operation.

It will be seen that the present device provides an extremely compact unitary structure containing all the mechanism necessary to provide for delivery of oil at a given volume and pressure by operating the two pumps in parallel or for delivery at half that volume and double that pressure by operating the two pumps in series.

The construction furthermore provides several practical advantages, among them being that the head plates and bearing plates, pump chamber rings and other parts are either identical or so nearly identical as to be capable of manufacture up to the last machining operation in common with each other. The pump unit may be assembled either at the time of its original manufacture or after disassembly in the field with the shaft projecting from either end of the body since the bearing caps are interchangeable from side to side. The provision of separate head plates and bearing plates furthermore avoids a difficulty in that the externally exposed bolts on the pump are all of them such that they may be tightened to any degree without interfering with the pump action, whereas, if the head plate bolts are exposed, they are frequently pulled up too tight by well-meaning but ignorant workmen.

In addition, the main body casting provides, by means of a few simple cores and a few drilled or bored passages, a complete set of inlet and outlet passages for two balanced vane pumps as well as making a housing for all of the control valves and providing all of the circuit connections necessary for automatic series-parallel control of such pumps. These corings and passages moreover are individually each of them of simple and direct form and arranged to carry the flow to and from the points where it must be carried by passages of minimum total length.

While the form of embodiment of the invention as herein disclosed constitutes a preferred form, it is to be understood that other forms might be adopted, all coming within the scope of the claims which follow.

What is claimed is as follows:

1. A rotary vane pump of the radially balanced type comprising a body having a cylindrical pump receiving recess, a rotary pumping unit of cylindrical form positioned in said recess, said unit having pairs of arcuate inlet ports positioned in the end faces of the unit adjacent the periphery thereof, and an inlet passage in the body extending from the outside of the body to the recess, said passage providing a clear passage around both ends and periphery of the unit adjacent and communicating with said inlet ports.

2. A rotary vane pump of the radially balanced type comprising a body having a cylindrical pump receiving recess, a rotary pumping unit of cylindrical form positioned in said recess, said unit having pairs of arcuate inlet ports positioned in the end faces of the unit adjacent the periphery thereof, and an inlet passage in the body extending from the outside of the body to the recess, the walls of said recess being cut away on both ends of and around the periphery of the unit at a point adjacent and communicating with said inlet ports where the inlet passage intersects the pump receiving recess.

JOHN F. JEANNIN.